(12) United States Patent
Emanuel

(10) Patent No.: US 9,262,506 B2
(45) Date of Patent: Feb. 16, 2016

(54) GENERATING MAPPINGS BETWEEN A PLURALITY OF TAXONOMIES

(75) Inventor: Barton W. Emanuel, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 13/474,871

(22) Filed: May 18, 2012

(65) Prior Publication Data

US 2013/0311474 A1    Nov. 21, 2013

(51) Int. Cl.
*G06F 17/30* (2006.01)

(52) U.S. Cl.
CPC .... *G06F 17/30598* (2013.01); *G06F 17/30731* (2013.01)

(58) Field of Classification Search
CPC .................. G06F 17/30598; G06F 17/30705; G06F 17/3071
USPC .................................. 707/737–740, 777–778
See application file for complete search history.

(56) References Cited

U.S. PATENT DOCUMENTS

| 6,675,161 | B1 * | 1/2004 | Suchter |
| 7,546,278 | B2 | 6/2009 | Yang et al. |
| 7,774,360 | B2 | 8/2010 | Sun et al. |
| 7,974,984 | B2 | 7/2011 | Reuther |
| 2006/0235870 | A1 * | 10/2006 | Musgrove ..................... 707/102 |
| 2006/0242147 | A1 | 10/2006 | Gehrking et al. |
| 2008/0109254 | A1 | 5/2008 | Ganesh et al. |
| 2009/0037457 | A1 | 2/2009 | Musgrove |
| 2009/0089270 | A1 | 4/2009 | Haley et al. |
| 2010/0185577 | A1 | 7/2010 | Tsaparas et al. |
| 2011/0004573 | A1 | 1/2011 | Chitiveli et al. |
| 2011/0078158 | A1 | 3/2011 | Mukherjea et al. |
| 2011/0231373 | A1 | 9/2011 | Rohan et al. |
| 2011/0252042 | A1 | 10/2011 | Wu et al. |

OTHER PUBLICATIONS

IBM, ip.com Prior Art Database Technical Disclosure, IPCOM000137134DJun. 9, 2006, (4 pages).
Robert L. Glass, et al., "Naïveté Squared: In Search of Two Taxonomies and a Mapping between Them", IEEE Software, 0740-7459/11, Sep./Oct. 2011, (pp. 14-15).

\* cited by examiner

*Primary Examiner* — Thu-Nguyet Le
(74) *Attorney, Agent, or Firm* — Joe Polimeni; Edell, Shapiro & Finnan, LLC

(57) ABSTRACT

A method, a system and a computer program product create mappings between taxonomies in which documents are classified from a category of a taxonomy to one or more categories within a master taxonomy based on a statistical model and classification score values. The document classifications are analyzed to determine a mapping between the taxonomy category and a corresponding category of the master taxonomy, where the category is mapped to the corresponding category in the master taxonomy in response to sufficient classification score values for the documents.

18 Claims, 3 Drawing Sheets

GENERATING MAPPINGS BETWEEN A PLURALITY OF TAXONOMIES

BACKGROUND

1. Technical Field

Present invention embodiments relate to mapping or merging of two or more taxonomies associated with content from different sources.

2. Discussion of Related Art

It is necessary at times to merge or map two or more taxonomies or folksonomies associated with content from different sources (such as two different departments, two different databases or enterprises, etc.) when combining content in some manner. The merging or mapping of the taxonomies, if accomplished in a proper manner, facilitates efficient searching or tagging of content utilizing the merged taxonomy.

Merging or mapping of a plurality of taxonomies to obtain a "master" taxonomy is a very important but time consuming operation, particularly when the process requires a significant amount of human intervention. An automated merging or mapping of taxonomies to form or define a master taxonomy, with little or no human intervention, is desirable. However, it is important to provide an automated process that is efficient and provides an accurate analysis of content from different sources in order to appropriately categorize the content from all sources in the merged "master" taxonomy.

BRIEF SUMMARY

Embodiments of the present invention include a method, a system and a computer program product for creating mappings between taxonomies in which documents are classified from a category of a taxonomy to one or more categories within a master taxonomy based on a statistical model and classification score values. The document classifications are analyzed to determine a mapping between the taxonomy category and a corresponding category of the master taxonomy, where the category is mapped to the corresponding category in the master taxonomy in response to sufficient classification score values for the documents.

DETAILED DESCRIPTION

Present invention embodiments pertain to systems from which a variety of different types of content in documents (e.g., content in the form of textual documents) is available. The systems include at least one computing device, such as a server, that is configured to obtain documents from one or more databases or other data sources and is configured to identify descriptive content within the documents so as to generate taxonomies of classifications into which the documents are organized for a particular data source. For example, this facilitates easier organization and searching of documents from the data sources (e.g., based upon a search query from a user seeking documents of a certain content type or based upon organizing documents within categorized folders or some other organized structure). In certain scenarios, it may be necessary to combine documents from one data source with documents of another data source to facilitate searching of the combined content from the two data sources (e.g., combining content across two or more departments, two or more different databases, two or more enterprises, etc.). The data sources to which each set of documents is associated may have their own taxonomies for categorizing the documents. The systems of the present invention embodiments provide an automated mechanism for mapping or merging taxonomies for documents associated with two or more data sources.

Figure 1:
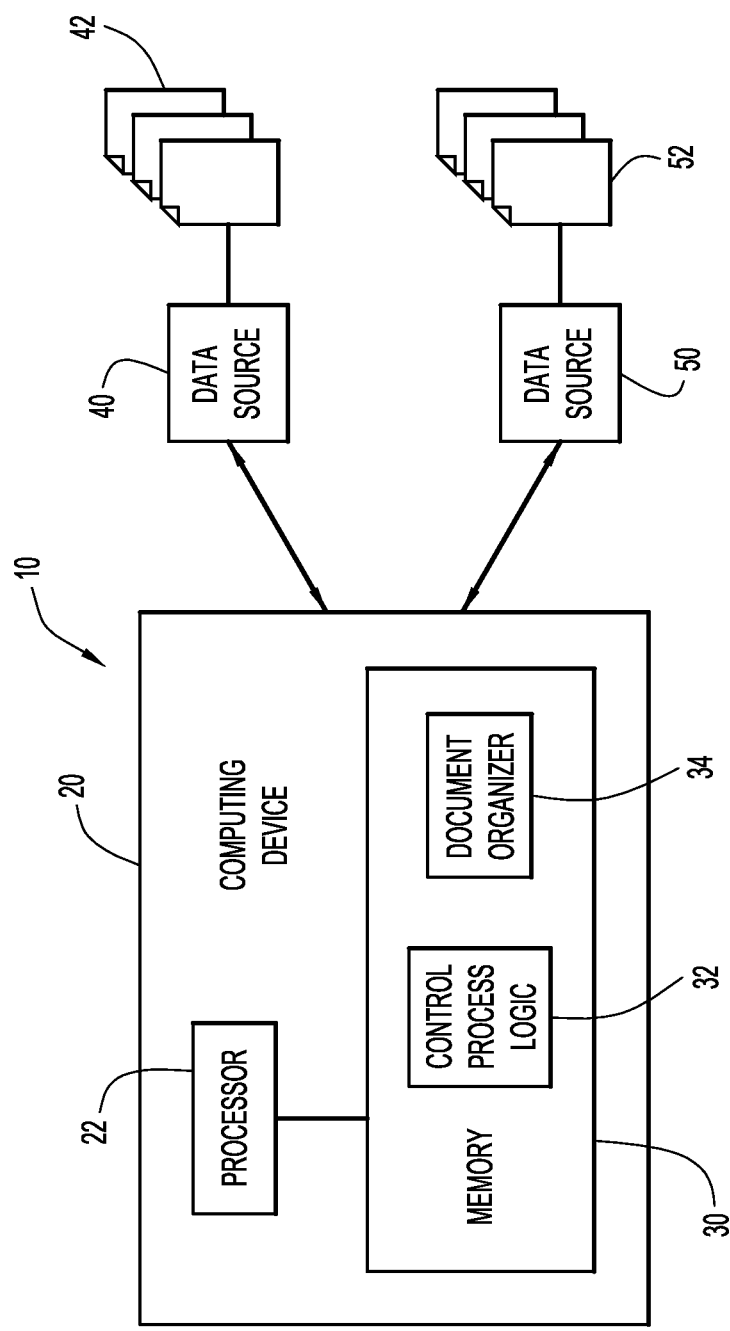
FIG. 1 is a diagrammatic illustration of a computing environment for an embodiment of the present invention.

An example computing environment for a system that generates and maps/merges taxonomies for documents from different data sources is illustrated in FIG. 1. Specifically, the system 10 includes a computing device 20 that is connected with data sources 40, 50. While only two data sources are depicted in FIG. 1, it is noted that the computing device 20 can be connected with any suitable number of data sources to facilitate categorizing of document content within the data sources and searching of such content. The computing device 20 can optionally be configured as a server that serves one or more client or end-user computing devices that may be connected with the server. The computing device 20 can connect with the data sources 40, 50 and/or other computing devices that are local and/or distant from each other via any number of any suitable types of communications media (e.g., wide area network (WAN), local area network (LAN), Internet, Intranet, hardwire, wireless link, etc.).

The computing device 20 of the system 10 may be implemented by any conventional or other computer system that is equipped with a display or monitor, a base including at least one processor 22, a memory 30 and/or internal or external network interface or communications devices (e.g., modem, network cards, etc.) and optional input devices (e.g., a keyboard, mouse, or other input device). The memory 30 can be RAM and/or ROM memory configured as one or more hardware units of the computing device 20. The memory 30 includes a control process logic software module 32 including operating system code for the processor 22 as well as any other commercially available and custom software to facilitate operations of the computing device 20 utilizing the processor 22 (e.g., browser software, communications software, server software, natural language processing software, etc.). In particular, the memory 30 includes a document organizer module 34, which may include one or more modules or units including one or more software programs, that facilitates identification and classification of documents from data sources (such as data sources 40 and 50) and the generation of taxonomies associated with such documents.

The data sources 40 and 50 can each comprise one or more computing systems including databases that store documents 42, 52 of any number of different types (e.g., written or text documents, documents which include text, images and/or other data from which the text can be extracted, etc.) that are accessible by the computing device 20.

Figure 2:
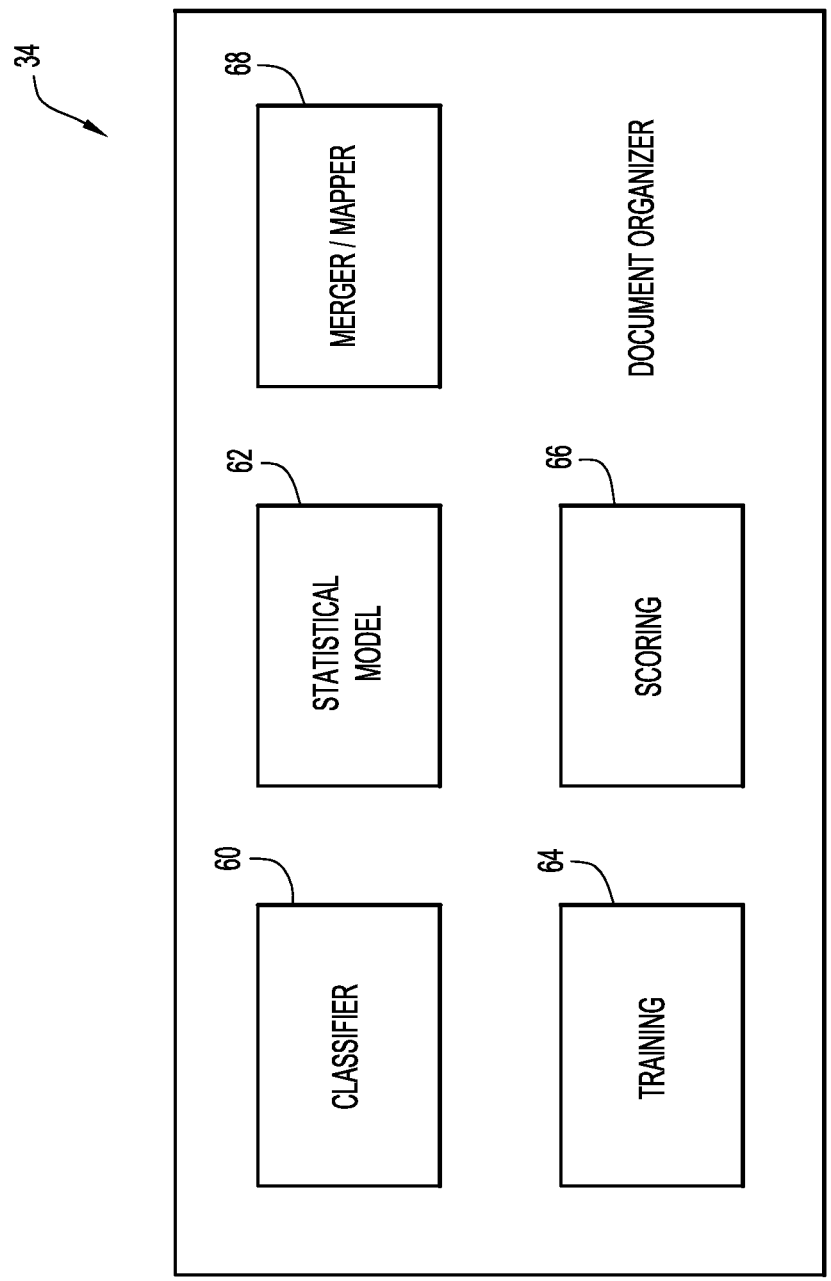
FIG. 2 is a diagrammatic illustration of a document organizer module that generates taxonomies and maps or merges one or more taxonomies with another taxonomy.

Referring to FIG. 2, the document organizer module 34 includes a classifier module 60, a statistical model module 62, a training module 64, a scoring module 66 and a merger/mapper module 68. The various modules 60-66 facilitate generation of a taxonomy for a collection of documents from any data source in a manner similar to those that are known in existing commercially available classifiers, such as the IBM®

Classification Module (ICM). (IBM is a trademark of International Business Machines Corporation, registered in many jurisdictions worldwide.)

Figure 3:
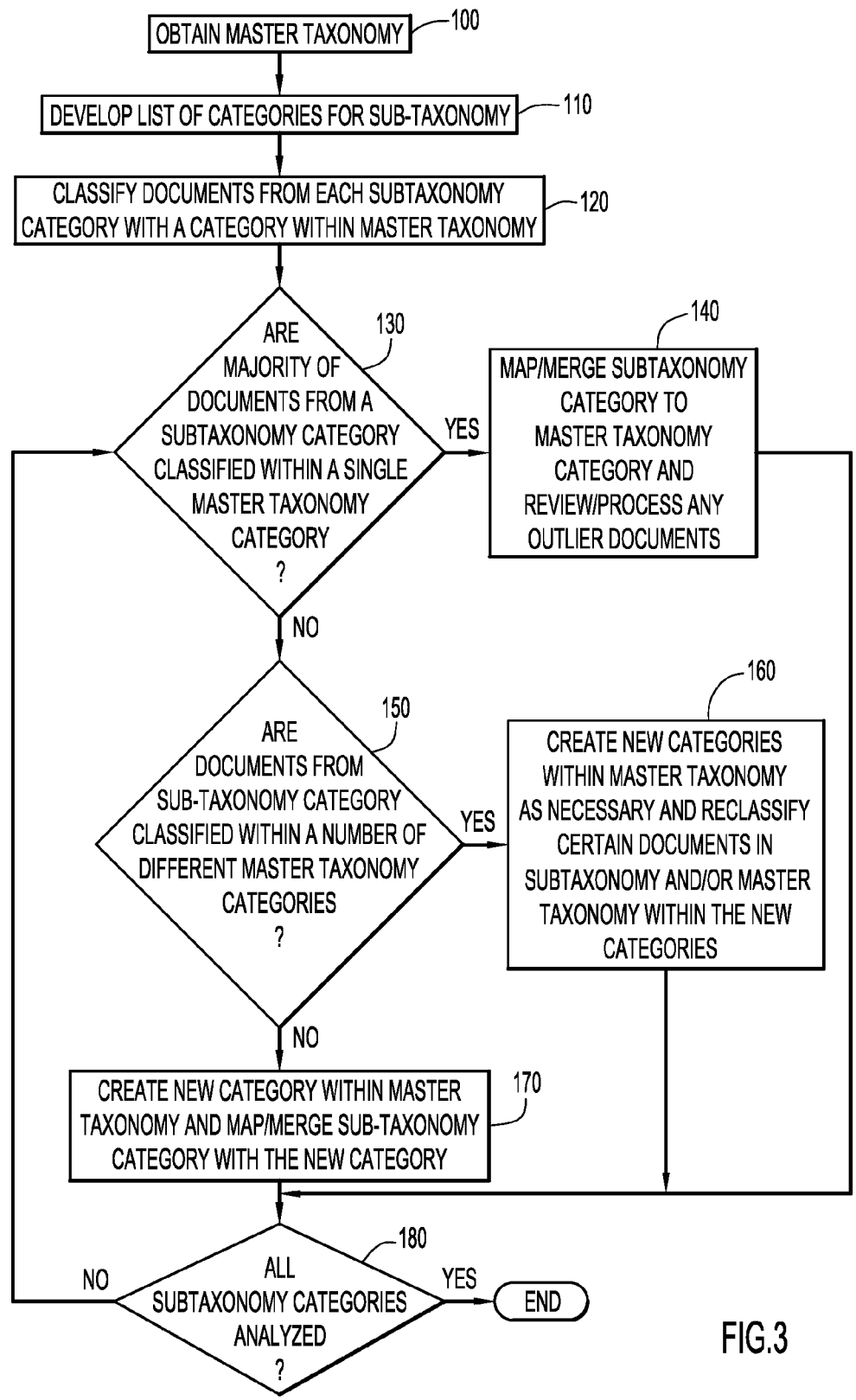
FIG. 3 is a procedural flow chart illustrating an example manner in which at least one taxonomy is merged or mapped with another to obtain a master taxonomy according to an embodiment of the present invention.

In particular, the classifier module 60 identifies documents within a data source based upon a number of factors, including document type, document author, content of document, etc. Metadata and/or any other suitable types of data associated with each document can be used by the classifier module 60 to obtain content information and/or any other types of information about each document that is utilized for classification purposes. The training module 64 is used to train the classifier module 60, where certain documents are initially selected from the corpus within the data source (e.g., based upon a random sampling of the document corpus, a preliminary scoring of documents for training purposes and/or any other criteria). The statistical model module 62 is used by the classifier module 60 to obtain a statistical profile (e.g., construct a model) of the set of training documents in order to obtain classifications or categories for content associated with the data source and in which documents are to be classified. Based upon analysis of the training documents, categories and/or one or more levels of sub-categories are generated (e.g., categories and any number of levels of depending sub-categories, such as sub-categories of sub-categories, etc., in a multiple branched tree or hierarchical format) and the documents from the corpus are associated with an appropriate category/sub-category. A scoring module 66 is utilized to develop a scoring system that scores each document based upon its content for each category/sub-category. While the scoring module 66 is depicted as separate from the classifier module 60, it is noted that these modules (as well as any of the other modules) can optionally be implemented as a single module. Based upon its score for a particular category, it is determined whether a document belongs in such category or is more appropriately placed within another category. After a suitable period of training, in which the classifier module 60 is deemed to have identified, scored and appropriately categorized a sufficient number and types of documents, the classifier module 60 can then categorize the remaining documents within the corpus by scoring the documents for each category so as to associate the documents with their appropriate categories/sub-categories. As previously noted, the training (e.g., utilizing training module 64) utilizing sample documents, development of a suitable scoring system and generation of a taxonomy including categories and/or sub-categories into which documents from the corpus are associated (e.g., utilizing the classifier module 60, statistical model module 62 and scoring module 66) is known (e.g., utilizing a software module such as IBM Classification Module). The merger/mapper module 68 of the document organizer module 34 facilitates combining two or more taxonomies (e.g., taxonomies associated with different data sources, such as data sources 40 and 50) into a single, master taxonomy in accordance with embodiments of the invention. The manner in which the merger/mapper module 68 is utilized to combine a plurality of taxonomies into a single, master taxonomy is described with reference to the flow chart of FIG. 3. At 100, a master taxonomy is obtained. The master taxonomy could be, for example, the taxonomy of a single data source, such as one of the data sources 40 and 50, which is obtained in a manner as previously described herein utilizing the document organizer module 34 of the computing device 20. At 110, a list of the categories is obtained for a second taxonomy associated with another data source, such as the other of data sources 40 and 50. The second taxonomy for the other data source can be obtained in a similar manner as the master taxonomy by categorizing the documents from the other data source. The second taxonomy is also referred to herein as a sub-taxonomy, since the sub-taxonomy will be mapped or merged into the master taxonomy. It is further noted that the master taxonomy can already have a trained classifier module that has been determined as reliable, such that little or no additional training may be needed for categorizing further documents within the master taxonomy (unless documents from the sub-taxonomy present issues with finding appropriate categories within the master taxonomy, in which case new and/or revised categories may be added to the master taxonomy in the manner described herein). At 120, for each category of the sub-taxonomy, documents are categorized with a classifier trained on the master taxonomy. In particular, a sample set of documents can be obtained from each category of the sub-taxonomy, and the classifier module 60 (utilizing the scoring module 66) categorizes and scores each document in relation to one or more categories within the master taxonomy. For example, the score associated with a category in the master taxonomy for each document of the sub-taxonomy provides a confidence indication of how well the document fits within the master taxonomy category. The best score (e.g., highest score) associated with a particular master taxonomy category for a document associated with the sub-taxonomy can provide an indication that this master taxonomy category provides the best fit for the document during the taxonomy mapping/merging process. In this manner, a best fit within a master taxonomy category can be obtained for each document associated with a sub-taxonomy category. The score value can further provide an indication of whether the best fit is in fact a good fit for the document in the master taxonomy category. For example, if the highest score value for a document associated with the sub-taxonomy is below a threshold level, it may be determined that no category within the master taxonomy provides a good fit for the document. Alternatively, a score value for a document associated with the sub-taxonomy that is above a threshold value may provide an indication that the document fits well within a particular category of the master taxonomy.

At 130, it is determined (utilizing the merger/mapper module 68) whether a majority of the documents from a particular category of the sub-taxonomy are classified within a single taxonomy category (or sub-category) of the master taxonomy. For example, the process may begin at the first designated category within the list of categories from the sub-taxonomy and analyze the documents within this category to see how they are classified within the master taxonomy (where the next category within the list of categories of the sub-taxonomy is then analyzed after the documents of the first category have been processed, and then continuing sequentially through the list of sub-taxonomy categories until the final category has been analyzed). If a majority of the documents within the sub-taxonomy category being analyzed have been classified within the same single and already existing category of the master taxonomy, a rule is automatically created, at 140, that maps or merges the sub-taxonomy category with the corresponding category of the master taxonomy such that the documents determined to fit within this master taxonomy category are now searchable/obtainable via this master taxonomy category. As used herein, mapping refers to providing a link between the categories of two taxonomies, which can be accomplished by either maintaining two separate taxonomies but linking their categorizations together (such that some or all of the categories/sub-categories within one taxonomy are linked within corresponding categories/sub-categories of another taxonomy) or by merging the two taxonomies to form a single taxonomy (such that categories/subcategories of one taxonomy are merged within corresponding categories/subcategories of the other taxonomy).

Any documents that are not within the majority for the sub-taxonomy category being analyzed (i.e., these documents have a score value that places them within other categories of the master taxonomy or have a low score value below a threshold value thus indicating a low confidence in which the majority of other documents within the sub-taxonomy category being analyzed are to be mapped/merged) are designated as outliers. The designated outliers can be flagged for further processing (e.g., by an administrator manually reviewing the outliers to see whether they belong in separate categories of the master taxonomy). If it is determined that the outliers still belong within the master taxonomy category in which the majority of documents have been classified, the classifier module 60, the statistical model module 62 and/or any one or more of the other modules of the document organizer module 34 can be revised/updated in a suitable manner in relation to the master taxonomy in order to improve upon the classification of other documents having similar content properties as the outliers within appropriate categories of the master taxonomy.

In the event there is not a majority of documents within the sub-taxonomy category being analyzed that fit within a single master taxonomy category, it is next determined, at 150, whether documents from the sub-taxonomy category fit within a number of different master taxonomy categories. In this process step, the documents that fit within the different master taxonomy categories can be determined as being a good fit when their score values are above predetermined threshold values associated with such master taxonomy categories. If it is determined (utilizing the document organizer module 34) that documents from the sub-taxonomy category are a good fit within a number of different master taxonomy categories, at 160 these documents are further evaluated to determine whether one or more new categories should be created within the master taxonomy with a re-classification of documents within one or both of the sub-taxonomy and master taxonomy into the newly created category or categories of the master taxonomy. If it is determined to create one or more new categories within the master taxonomy, the documents from the sub-taxonomy category can be used as basis for training the classifier module 60 regarding how to classify documents for each of the new categories of the master taxonomy. The classification of documents for the new categories can be achieved based upon a rule-based classification and/or statistical classification. Rule-based classification uses a set of rules to perform classification, where the rules may be human generated and/or invoke statistical methods or relatively simple methods like keyword matches for specific keywords in document text. Rules in a rule-based classification can be chained, sequenced, or arranged in a workflow with conditional execution of rules based on evaluation of previous rule results or other factors. Statistical classification uses a statistical model based on training and/or supervised or unsupervised machine learning to perform classification.

At 170, if it is determined that there are not a majority of documents within the sub-taxonomy category being analyzed that fit (e.g., are a good fit) within a single master taxonomy category and also there are not a plurality of master taxonomy categories within which documents may fit, a determination is made whether to create a new category within the master category. For example, a majority of the documents for the sub-taxonomy category may perform poorly (e.g., have score values that fall below a threshold value indicating a good fit) against any category within the master taxonomy. In this instance, a new category is created for the master taxonomy to which the sub-taxonomy category being analyzed including its documents is mapped or merged.

At 180, it is determined whether any additional sub-taxonomy category needs to be analyzed for mapping/merging with the master taxonomy. In the event another sub-taxonomy category needs to be analyzed, the process is repeated with the next category at step 130.

Thus, the systems and corresponding methods described herein provide an automated, efficient and reliable mapping or merging of two or more taxonomies. This is useful in scenarios in which two or more data sources need to be combined (e.g., when merging databases, data stores, or enterprises so as to allow users to easily search for content from all the merged sources). In addition, while the embodiments have been described in relation to taxonomies, it is noted that the embodiments are also applicable to folksonomies, with the process for achieving the mapping or merging of two or more folksonomies being the same or similar as that for taxonomies. A master taxonomy can be initially designated, e.g., by selecting a taxonomy associated with one of the data sources to be merged as the master taxonomy. The other taxonomies (designated as sub-taxonomies) can then be mapped to or merged with the master taxonomy by identifying related categories between the master taxonomy and the sub-taxonomies, creating new categories within the master taxonomy when necessary (e.g., in scenarios in which it is determined that there is no category within the master taxonomy that corresponds as a good fit with a category of a sub-taxonomy), and identifying and processing outlier documents in sub-taxonomy categories that do not conform in the same manner as other documents in the same sub-taxonomy categories in relation to identified categories of the master taxonomy being deemed as a good fit for the other documents.

It will be appreciated that the embodiments described above and illustrated in the drawings represent only a few of the many ways of implementing embodiments for generating a mapping/merging between two or more taxonomies.

The topology or environment of the present invention embodiments may include any number of computer or other processing systems (e.g., client or end-user systems, server systems, etc.) and search engines, databases, or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any available operating system and any available or custom software (e.g., browser software, communications software, server software, natural language processing software, search engine and web crawling software, etc.). These systems may include any types of monitors and input devices (e.g., keyboard, mouse, voice recognition, touch screen, etc.) to enter and/or view information.

It is to be understood that the software (e.g., the document organizer module, classifier module, statistical model module, training module, scoring module, merger/mapper module and any other suitable modules associated with the document organizer module or any other components of the systems) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among any one or more types of computing systems, including end-user/client and server systems, and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a computer useable or recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number data sources implemented as any conventional or other types of databases, data stores or storage structures (e.g., files, databases, data structures, data or other repositories, etc.) to store documents and related content associated with such documents.

The present invention embodiments may employ any number of any type of user interface (e.g., Graphical User Interface (GUI), command-line, prompt, etc.) for obtaining or providing information (e.g., obtaining information for a desired query of one or more data sources, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for creating mappings between taxonomies, the computer program product comprising:
    a computer readable storage device having computer readable program code embodied therewith, the computer readable program code configured to:
    classify documents from a category of a taxonomy to one or more categories within a master taxonomy based on a statistical model and classification score values, wherein the classification score values indicate whether the documents belong in a corresponding category of the master taxonomy;
    analyze the document classifications to determine a mapping between the taxonomy category and the corresponding category of the master taxonomy, a rule-based mapping is automatically created that maps the taxonomy category to the corresponding category in the master taxonomy in response to classification score values for the documents being above a threshold and in response to a majority of documents of the taxonomy category being classified within a single corresponding category of the master taxonomy;
    analyze the document classifications to identify outlier documents within the taxonomy category to determine whether the outlier documents should belong to the corresponding category; and
    update the statistical model when the outlier documents should belong to the corresponding category.

2. The computer program product of claim 1, wherein the taxonomy category is mapped to the corresponding category in the master taxonomy, and the computer readable program code is further configured to:
    identify the outlier documents from the documents having insufficient classification score values indicating that the documents have classification score value that are insufficient for further evaluation for classification into the corresponding category in the master taxonomy.

3. The computer program product of claim 2, wherein the computer readable program code is further configured to:
    create at least one new category in the master taxonomy for the outlier documents in response to a sufficient quantity of the outlier documents having insufficient classification score values.

4. The computer program product of claim 3, wherein the computer readable program code is further configured to:
    re-classify documents of the master taxonomy within the at least one new category.

5. The computer program product of claim 3, wherein the computer readable program code is further configured to:
    perform a classification to determine a mapping to the at least one new category of the master taxonomy utilizing documents of the taxonomy.

6. The computer program product of claim 1, wherein the computer readable program code is further configured to:
    identify the outlier documents from the documents having a classification in one or more categories other than the corresponding category of the master taxonomy.

7. The computer program product of claim 1, wherein the computer readable program code is further configured to:
    evaluate the outlier documents having a classification in one or more categories other than the corresponding category of the master taxonomy to determine whether to create at least one new category; and create the at least one new category in the master taxonomy for the outlier documents in response to results of the evaluation.

8. The computer program product of claim 7, wherein the computer readable program code is further configured to:

re-classify documents of the master taxonomy within the at least one new category.

9. The computer program product of claim 7, wherein the computer readable program code is further configured to:

perform a classification to determine a mapping to the at least one new category of the master taxonomy utilizing documents of the taxonomy.

10. A system for creating mappings between taxonomies, the system comprising:

at least one data source comprising a master taxonomy of documents and a taxonomy of documents; and a processor configured with logic to:

classify documents from a category of the taxonomy to one or more categories within the master taxonomy based on a statistical model and classification score values, wherein the classification score values indicate whether the documents belong in a corresponding category of the master taxonomy;

analyze the document classifications to determine a mapping between the taxonomy category and a corresponding category of the master taxonomy, a rule-based mapping is automatically created that maps the taxonomy category to the corresponding category in the master taxonomy in response to classification score values for the documents being above a threshold and in response to a majority of documents of the taxonomy category being classified within a single corresponding category of the master taxonomy;

analyze the document classifications to identify outlier documents within the taxonomy category to determine whether the outlier documents should belong to the corresponding category; and update the statistical model when the outlier documents should belong to the corresponding category.

11. The system of claim 10, wherein the taxonomy category is mapped by the processor to the corresponding category in the master taxonomy, and the processor is further configured with logic to:

identify the outlier documents from the documents having insufficient classification score values indicating that the documents have classification score values that are insufficient for further evaluation for classification into the corresponding category in the master taxonomy.

12. The system of claim 11, wherein the processor is further configured with logic to:

create at least one new category in the master taxonomy for the outlier documents in response to a sufficient quantity of outlier documents having insufficient classification score values.

13. The system of claim 12, wherein the processor is further configured with logic to:

re-classify documents of the master taxonomy within the at least one new category.

14. The system of claim 12, wherein the processor is further configured with logic to:

perform a classification to determine a mapping to the at least one new category of the master taxonomy utilizing documents of the taxonomy.

15. The system of claim 10, wherein the processor is further configured with logic to:

identify the outlier documents from the documents having a classification in one or more categories other than the corresponding category of the master taxonomy.

16. The system of claim 10, wherein the processor is further configured with logic to:

evaluate the outlier documents having a classification in one or more categories other than the corresponding category of the master taxonomy to determine whether to create at least one new category; and create the at least one new category in the master taxonomy for the outlier documents in response to results of the evaluation.

17. The system of claim 16, wherein the processor is further configured with logic to:

re-classify documents of the master taxonomy within the at least one new category.

18. The system of claim 16, wherein the processor is further configured with logic to:

perform a classification to determine a mapping to the at least one new category of the master taxonomy utilizing documents of the taxonomy.

* * * * *